United States Patent
Bieri

(10) Patent No.: US 6,920,871 B2
(45) Date of Patent: Jul. 26, 2005

(54) CABLE SAW

(75) Inventor: Hans Bieri, Pfäffikon (CH)

(73) Assignee: Tyrolit Hydrostress AG, Pfäffikon (CH)

( * ) Notice: Subject to any disclaimer, the term of this patent is extended or adjusted under 35 U.S.C. 154(b) by 66 days.

(21) Appl. No.: 10/182,576

(22) PCT Filed: Jan. 29, 2001

(86) PCT No.: PCT/CH01/00065

§ 371 (c)(1),
(2), (4) Date: Oct. 2, 2002

(87) PCT Pub. No.: WO01/56729

PCT Pub. Date: Aug. 9, 2001

(65) Prior Publication Data

US 2003/0172791 A1 Sep. 18, 2003

(30) Foreign Application Priority Data

Jan. 31, 2000 (CH) .................................................. 184/00
Jul. 25, 2000 (CH) .................................................. 1466/00

(51) Int. Cl.⁷ ................................................ B28D 1/08

(52) U.S. Cl. ................................ 125/16.02; 125/16.01; 125/18; 125/21; 83/200.1

(58) Field of Search ........................... 125/16.02, 16.01, 125/18, 21, 16, 35; 83/200.1, 651.1, 302.1

(56) References Cited

U.S. PATENT DOCUMENTS

| | | | | |
|---|---|---|---|---|
| 3,824,982 A | * | 7/1974 | Bowman | 125/12 |
| 4,735,188 A | * | 4/1988 | Kubo | 125/21 |
| 4,854,296 A | * | 8/1989 | Pittet | 125/21 |
| 4,893,607 A | * | 1/1990 | Kubo | 125/21 |

\* cited by examiner

*Primary Examiner*—George Nguyen
(74) *Attorney, Agent, or Firm*—Robert E. Bushnell, Esq.

(57) ABSTRACT

The invention relates to a cable saw device (1) comprising a sawing cable (25) and a cable storage device (30) which is used for temporary accommodation of the sawing cable (25). The cable storage device (30) comprises several deflection rollers (5,6). At least two of said deflection rollers (5,6) are placed at a modifiable axial distance (A) from each other. The cable saw (25) is driven by several deflection rollers (5). Means for compensating the different speeds of the cable saw (25) are arranged between the driving deflection rollers (5).

40 Claims, 5 Drawing Sheets

CABLE SAW

CROSS-REFERENCE TO RELATED APPLICATIONS

Figure 1:
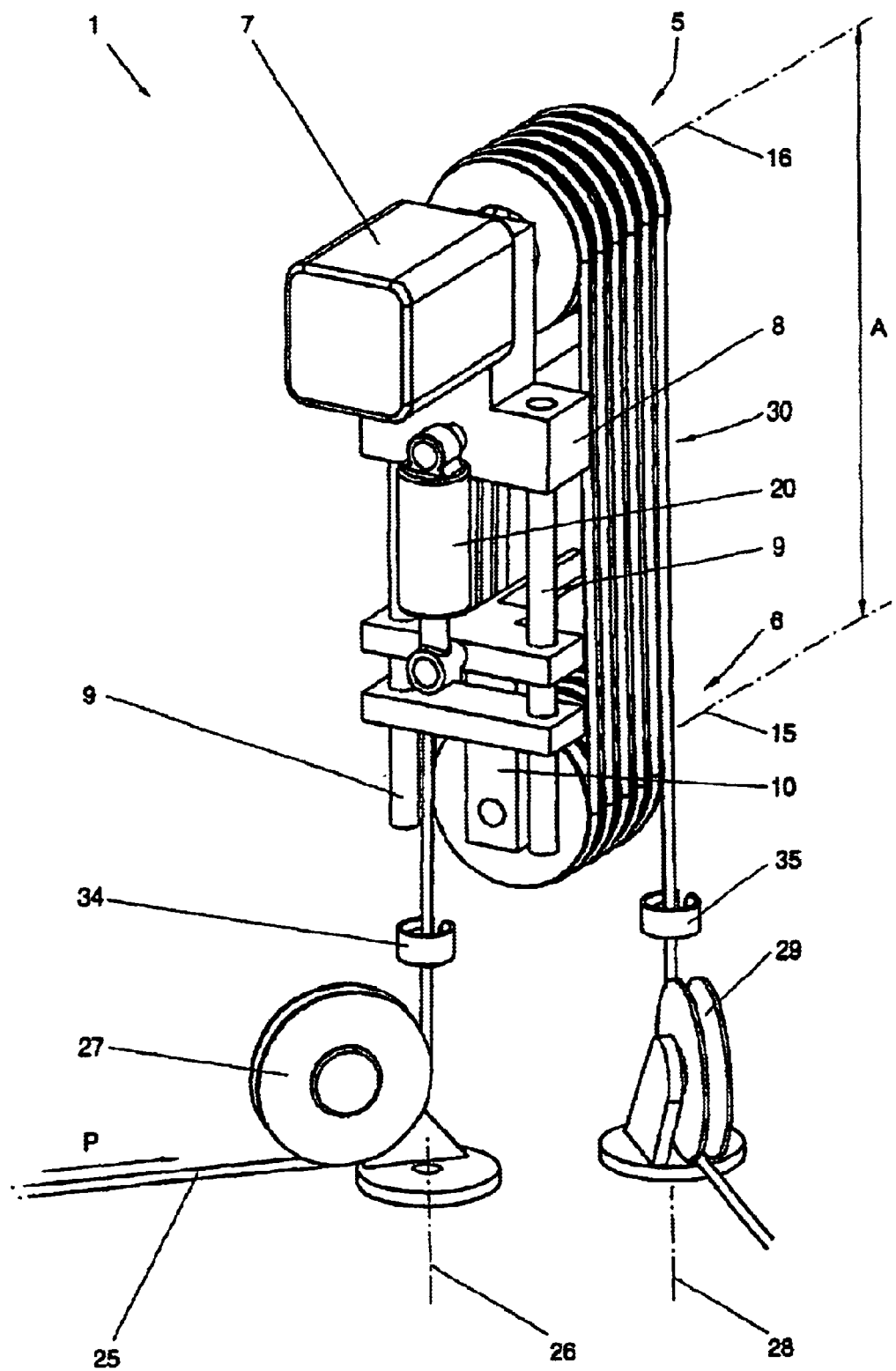

This application refers to and relates to a PCT application entitled CABLE SAW filed in the World Intellectual Property Organization via the Swiss Federal Institute of Intellectual Property on 29 Jan. 2001, there assigned Application No. PCT/CH01/00065, and later published as publication No. WO 01/56729 A1 on 9 Aug. 2001.

CLAIM FOR PRIORITY

This application makes reference to, incorporates the same herein, and claims all right accruing from our earlier filing of two Swiss patent applications entitled CABLE SAW filed in the Swiss Federal Institute of Intellectual Property on the 31 Jan. 2000 and 25 Jul. 2000 and there assigned Ser. No. 184/2000 and 1466/2000, respectively.

BACKGROUND OF THE INVENTION

The invention relates to a cable saw according to the precharacterizing clause of the independent Patent Claims.

The prior art discloses cable saws which have a continuously revolving cable and by means of which rock, concrete, masonry, etc. can be cut. The cable released during cutting has to be stored. This is achieved, for example, by storing the released cable in a machine, by varying the distance between correspondingly arranged deflection rollers. Very efficient cable storage is possible by means of roller groups arranged similarly to a block and tackle, since a very large amount of cable can be stored by means of small movements.

DE 298 05 157 discloses an arrangement which has two statically arranged roller groups and a large drive wheel. The statically arranged roller groups serve for manually rolling up the released cable. The drive power is transmitted via the one drive wheel to the cable to be driven. The length of the cable is reached through a corresponding movement of the drive wheel. The arrangement disclosed in DE 298 05 157 is very large.

DE 298 05 457 discloses a cable saw device which has a cable storage device with two roller groups. A drive wheel is located outside the cable storage device. The roller groups have no active drive.

WO 95/18692 discloses a saw device. This has a plurality of deflection rollers which are substantially all arranged in a plane. This unit is very large and is therefore not suitable for use where space is limited. The drive has a concentrated action in one place on the sawing cable.

PCT/CH94/00186 of the same Applicant discloses a cable saw which has a cable storage device similar to a block and tackle. Two hydraulic motors which serve for driving the cable are arranged at the inlet and at the outlet of the cable storage device. The drive rollers of this cable saw are substantially smaller than in the case of DE 298 05 157.

In the case of certain arrangements disclosed in the prior art, the problem arises that tears in the sawing cable frequently occur. This phenomenon occurs in particular in the case of arrangements having large cable storage devices. Cable tears are dangerous and expensive since control of the sawing cable is lost and said cable has to be replaced or repaired, during which the working process stops. In the case of the arrangements disclosed in the prior art, the size of the cable storage device is as a rule limited. Owing to the forces acting, these cable storage devices cannot be arbitrarily extended. The sawing cables are as a rule subjected to excessive stress.

It is an object of the invention disclosed here to provide a cable saw which avoids cable tears and overloading of the machine parts, in particular during startup.

The invention disclosed here is based, inter alia, on specific management of the forces and their distribution within a cable saw device, in particular in a sawing cable. Distributed force induction into the sawing cable is deliberately aimed for. Consequently, local overloads and excessive stresses are eliminated. The philosophy of the invention disclosed here consists, inter alia, in driving the sawing cable section by section and with loads tailored to one another. Normal forces on the cable inside a cable storage device which can be adjusted in a controlled manner permit optimum traction. The drive means and the drive power/velocity transmitted by said means can preferably be individually tailored to one another. Overloading of the sawing cable, in particular during startup, is thus avoided and secondary stresses are prevented. The invention makes it possible to guide the sawing cable, in particular during startup, in a controlled manner in a cut.

In contrast to the processing of natural stone, a suboptimum cutting geometry often has to be employed during construction. Construction elements frequently have more or less inhomogeneous composition (iron, cavities, foreign materials), which makes it more difficult to control the machining process (cutting process). Conventional diamond cable saw concepts do not adequately take these circumstances into account. In order to guarantee safe and economical use of the cable saw technology, the invention makes it possible actively to control the cutting conditions and hence the stresses in the cable. Particularly advantageous in this context are distributed load inductions, an intermediate storage device concept and an adaptive feed system.

During operation of a cable saw device according to the invention, a distinction is made in principle between two modes: startup and sawing. For example, for mastering large cuts with long cables or difficult cutting geometries with many corners and edges, in particular the startup plays a very important role. For this purpose, the invention disclosed here preferably uses a distributed load induction into the sawing cable, an intermediate storage device concept and an adaptive feed system which simplifies the "sawing" mode. The loads induced are tailored to one another and coordinated by compensating means.

During startup of the sawing cable, reliable cable guidance is indispensable since the cable guides are "open" and a loose cable can jump off a roller. Furthermore, normal forces are also generated in the cut during startup, since the cable has to be moved, for example, around edges and other obstacles. These normal forces are disadvantageous in this phase but, owing to the wrap, cannot as a rule be avoided. Required startup torques and the resultant cable tensions are substantially larger than during the effective sawing operation, in particular in the case of conventional solutions. This is in particular a consequence of small radii still present during startup, which can lead locally to large normal forces and correspondingly large frictional forces. Conventional cable saws are therefore capable only of wrapping around two or three "corners" at the most. Systems which require high pretensioning forces for sufficient traction cannot be adapted to the cutting conditions. This leads to excessive cable wear and increases the risk of cable breaks.

In order to achieve a compact design of a cable saw, it is necessary to store the sawing cable not present in the cut in a space-saving manner. In the invention disclosed here, an actively driven cable storage device is therefore preferably used, which device consists, for example, of shafts which are arranged in parallel and on which a plurality of side-by-side rollers are arranged in such a way that the sawing cable continuously wraps around the rollers of the cable storage device. The distance between certain shaft axes is preferably continuously adjustable so that the storage volume of the cable storage device and also the translation ratio of feed are variable. The rollers located side by side are advantageously arranged in such a way that they are freely accessible from one side so that a closed cable can be applied in loops without the cable having to be opened. The rollers of the cable storage device are advantageously not arranged in a plane, since a corresponding arrangement can counteract the achievable efficiency. The cable storage device is driven as a rule by means of a plurality of rollers arranged in the region (inside) the cable storage device. These rollers are operatively connected to one another by a compensating means in such a way that they permit variable distribution of the drive power and ensure compensation. In particular, different velocities of the sawing cable can be compensated during the transmission of the drive power. If required, additional means which serve for actively controlling the sawing cable are provided in the region of the cable storage device. These are preferably means for measuring and controlling the cable tension, for example cable brakes, etc. The individual drive means can be tailored to one another in such a way that the cable tension inside and outside the cable storage device can be controlled and adjusted, in particular during startup.

In contrast to the arrangements disclosed in the prior art, the sawing cable in the invention disclosed here is driven at a plurality of points along its length and between mechanical resistances. Consequently, local overloading of the sawing cable and the associated wear phenomena or even cable rupture are avoided. Particularly during startup of a cable saw device according to the invention, the customary high forces do not occur. The loading of the individual drive points can be adjusted in line with requirements in such a way that optimum traction is achieved, in particular when the cable is introduced into the cut. This is achieved in particular by permitting optimum cable tension in the free sawing cable during power-up and an adaptive cable tension during sawing. In terms of the process, locally varying velocity in a sawing cable of a cable saw device having a plurality of driving cable deflection rollers is compensated by virtue of the fact that forces are transmitted from faster-running cable sections to slower-running cable sections.

Conventional systems require the operator to find a compromise on power-up between normal forces which are as low as possible in the cut (free sawing cable) and nevertheless high traction in the drive. If in fact the tension in the sawing cable is too high, the traction in the drive system is not sufficient to permit a startup. If it is too low, there is the danger that, on the one hand, the cable guidance is unreliable and, on the other hand, the drive has an impermissibly large amount of slip. During power-up, the operator must therefore carefully observe and adjust the cable tension. In the case of the invention disclosed here, forces are introduced into the sawing cable distributed at a plurality of points. Maximum loads are, if desired, adjustable in a specific manner via suitable means. For example the use of adjustable friction clutches is advantageous for load limitation. The multi-roll drive used here permits substantially tension-free running of the sawing cable into the cut, even with the use of a cable storage device. Normal forces in the cut are therefore small and the required startup torque is kept small.

If required, optimum traction of the drive wheels can be achieved by controlled "clamping" of the sawing cable in the drive system. If required, the sawing cable is retarded in the cable storage device before the inlets so that increased traction in the cable storage device (drive) is achieved. For example, one or more, spring-mounted rollers (pressure rollers, jockey rollers) are particularly suitable for this purpose and, for example, exert normal force during run-out of the sawing cable, in order to permit a decrease in tension. The operation of the drive system is thus greatly simplified since even a controlled small pretension of the cable in the cut permits reliable cable guidance during power-up. This pretension can be defined before the power-up.

During the sawing process, load variations frequently occur on the sawing cable. Reasons for this are an inhomogeneous structure of the construction element (steel structures, cavities), changes in the cut geometry, change in the abrasiveness in the cut, inhomogeneous sawing cable (assembled cable sections worn to different extents). The invention disclosed here has a preferably adaptive character. The invention is designed so that the cable tension and hence the normal forces in the cut are kept as constant as possible so that large load changes and tension peaks are avoided. This is based on, inter alia, a cable stretcher, also referred to as a feed system which exhibits no significant self-locking. Hydraulic and pneumatic systems are preferably used. Hydraulic systems additionally have the advantage of higher passive safety since they do not transmit any stored energy to the cable stretcher in the event of a cable break. This prevents the sawing cable from being unnecessarily tightened.

The length of the operating sawing cable can be determined by the spacing of the shafts of the cable deflection rollers advantageously arranged side by side. Specific cable deflection rollers transmit drive forces to the sawing cable. These rollers can be arranged on one and the same shafts or on different shafts. In particular they can be driven by the same or by different drive means. The drive means are preferably arranged along the sawing cable at regular or irregular (suppression of any oscillations) distances from one another, so that the drive power is transmitted gently and continuously to the sawing cable. In contrast to the prior art, the plurality of drive rollers should preferably be arranged between mechanical resistances.

Owing to a change in the free cable length, it is necessary for the cable in the cable storage device to perform a compensating movement in order to avoid harmful secondary tensions (cord tensions) from building up. It is particularly important that the cable deflection rollers involved permit this compensating movement. For this reason, the driving deflection rollers are formed or operatively connected to one another in such a way that they do not prevent a corresponding compensating movement. The arrangement, according to the invention, of the drive rollers and their operative connections ensure, inter alia, that the drive power is not transmitted to the sawing cable in an uncontrolled manner. The invention disclosed has, if required, means for controlling and compensating different cable tensions. Cable tensions are eliminated or built up in specific regions in a controlled manner. The regions before the sawing cable runs into a cable storage device, in the interior of the cable storage device or at the outlet from the cable storage device or at the inlet into a cut are particularly advantageous.

The invention disclosed here is based, inter alia, on the discovery that a compensation in a cable storage device has to be coordinated with the plurality of drive means acting on a sawing cable. A corresponding compensating movement is realized in various ways. In contrast to the cable storage devices disclosed in the prior art, the size of the cable storage device of the invention disclosed here is not limited. More than two drive rollers present no problem. Owing to the distributed load induction and the coupling of the driving rollers in a manner tailored to one another and their arrangement, the problems known from the prior art are deliberately avoided. Moreover, compact cable storage devices of any size can be realized by means of the invention disclosed here.

A preferred embodiment of a cable saw device according to the invention, comprising a sawing cable, has a cable storage device for holding a sawing cable. This consists of a plurality of cable deflection rollers, at least two of these cable deflection rollers having variable spacing relative to one another. This makes it possible to change the length of the sawing cable deflected in the cable saw device. A motor drives the sawing cable over a plurality of cable deflection rollers. Locally differing speeds of the sawing cable are compensated by compensating means between the plurality of driving cable deflection rollers.

The invention is explained in more detail with reference to the following figures.

Figure 2:
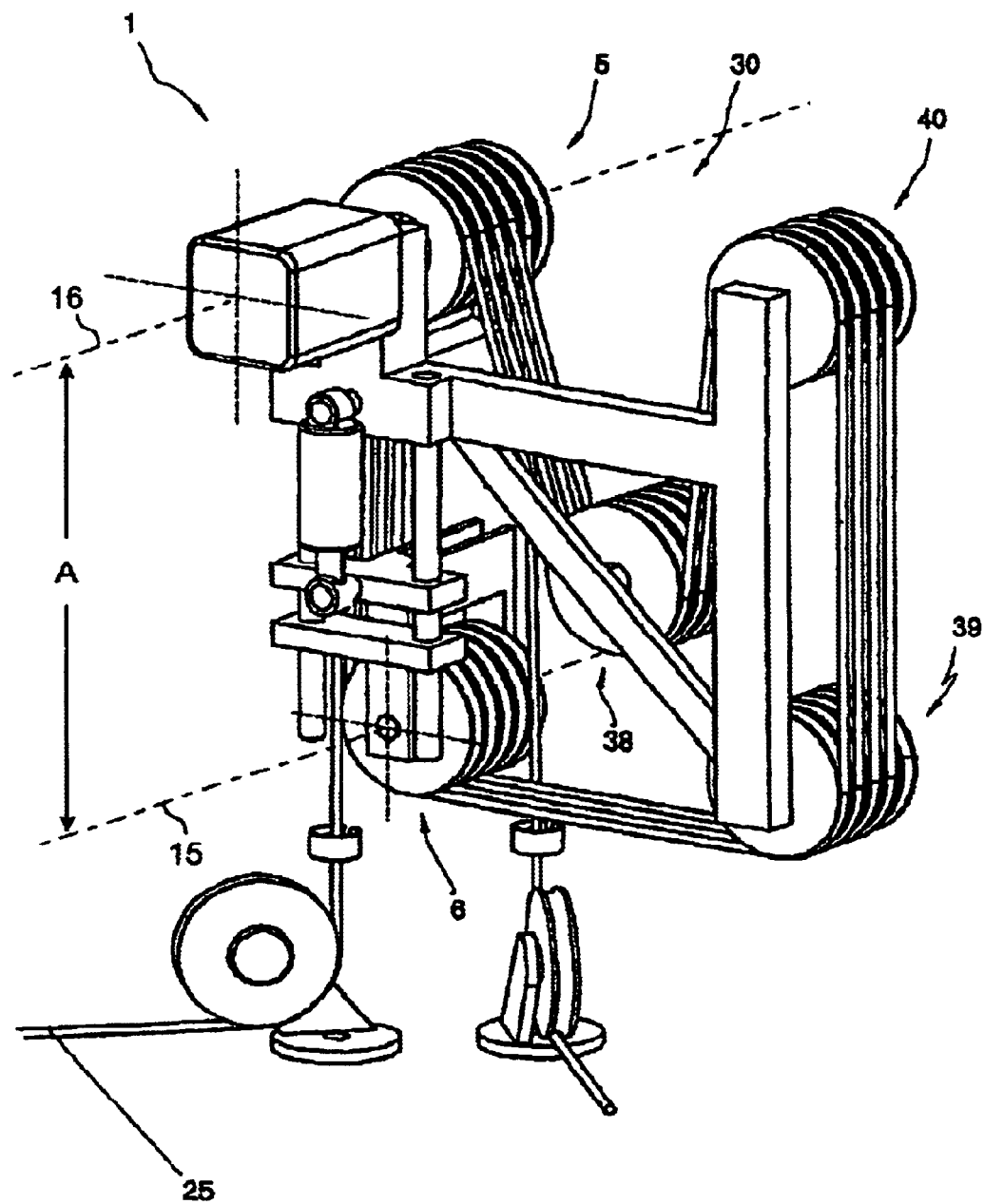
Figure 3:
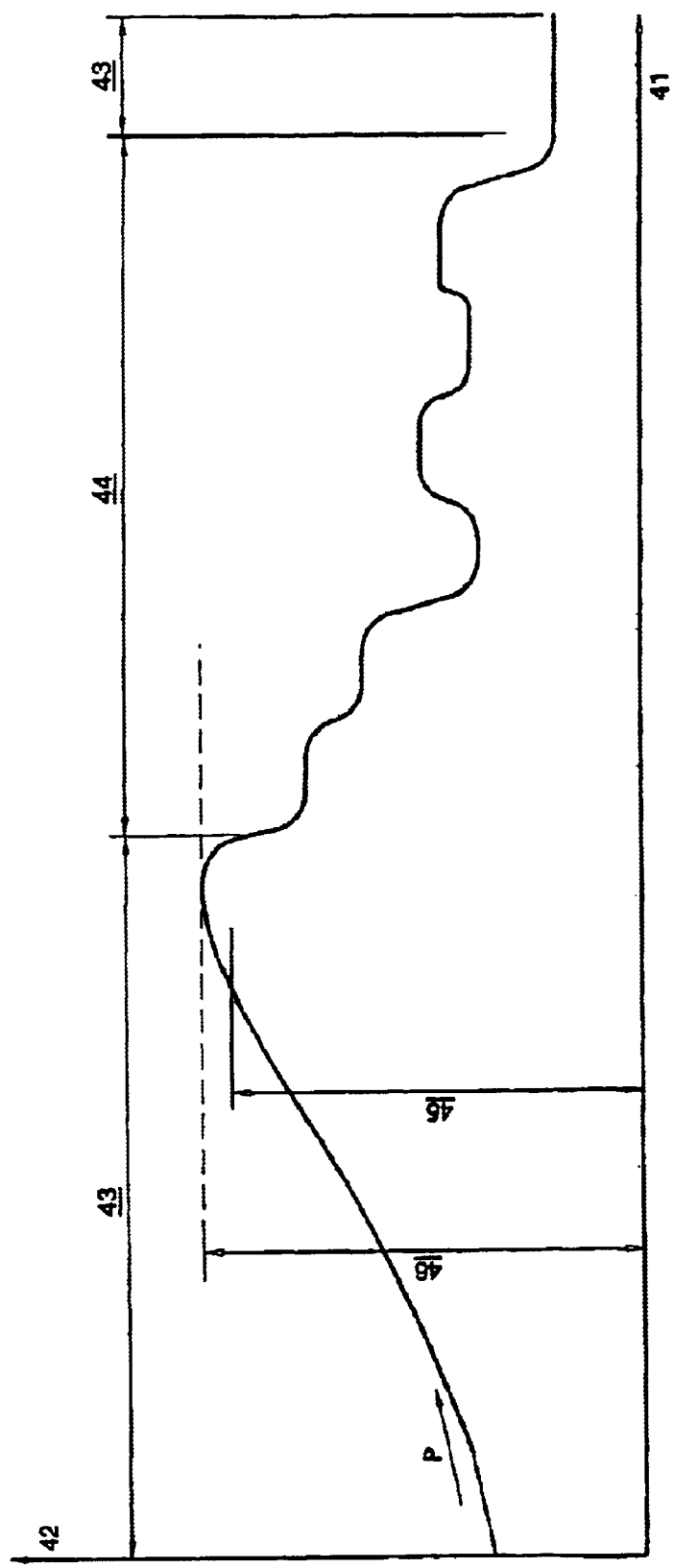
Figure 4:
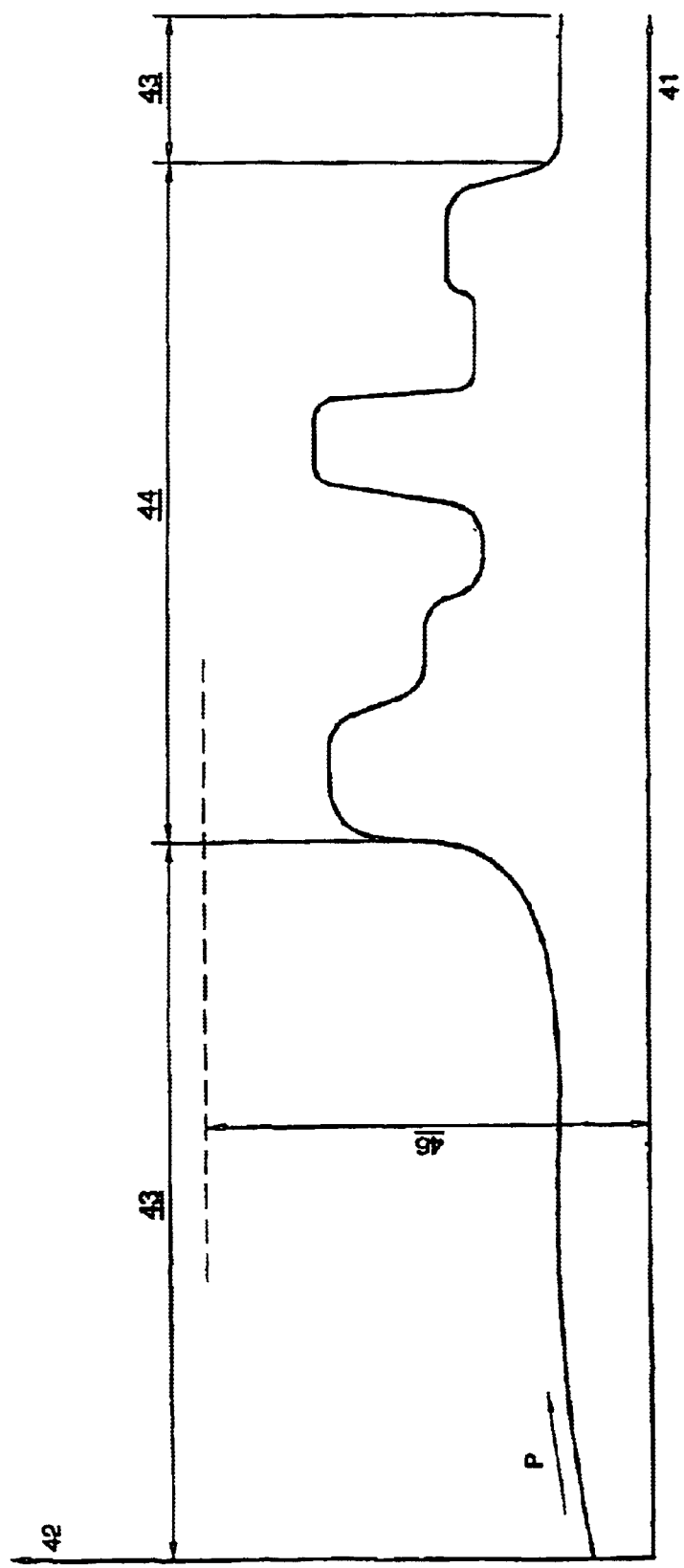
Figure 5:
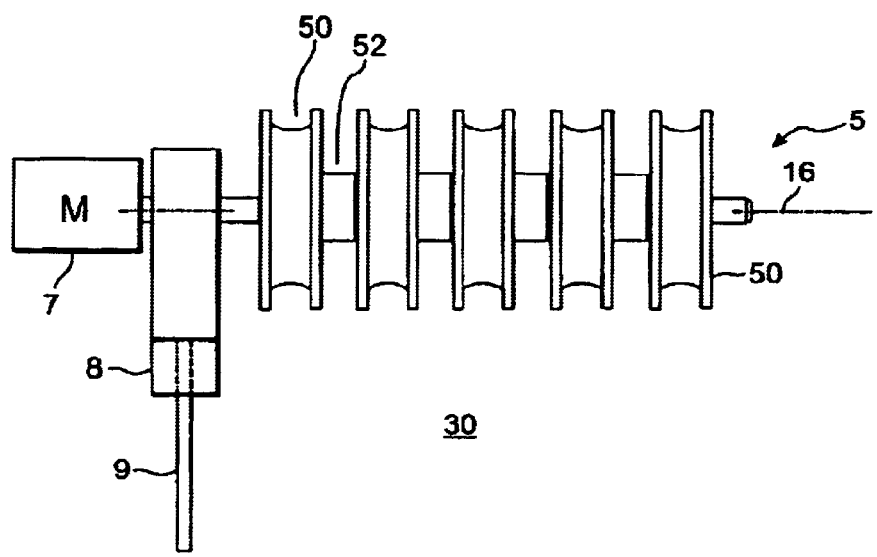

FIG. 1 schematically shows a cable saw device in perspective view;

FIG. 2 schematically shows the cable saw device according to FIG. 1 with an extended cable storage device;

FIG. 3 schematically shows a possible tension curve of a sawing cable during sawing;

FIG. 4 schematically shows a possible tension curve of a sawing cable during startup (power-up), and FIG. 5 is an elevational view illustrating an arrangement of one roller group.

FIG. 1 schematically shows a preferred embodiment of a cable saw device 1 according to the invention. A first roller group 5, a second roller group 6 and a motor 7 which can be fastened to a first retaining device 8 are shown. Here, the roller groups 5, 6 consist of a plurality of rollers located axially adjacent to one another. Here, the first roller group 5 consists of six rollers which are operatively connected by a drive axle 54 (shown in FIG. 5) of the motor 7.

Here, the first retaining device 8 has two struts 9 along which a second retaining device 10 is displaceably mounted. The second roller group 6 is fastened to the second, displaceable retaining device 10 in such a way that the rollers of the second roller group 6 are freely rotatable about a first axis 15. Here, the rollers of the first roller group 5 are arranged on a second axis 16 which is substantially aligned with the drive axle 54 (shown in FIG. 5) of the motor 7. Here, the first and the second axes 15, 16 are arranged substantially parallel. A hydraulic cylinder 20 which is operatively connected to the first and to the second retaining device 8, 10 serves for determining and changing a distance A between the first and the second roller group 5, 6, in particular during a cutting process.

Here, a sawing cable 25 extends from a first deflection roller 27 pivotable about a third axis 26, via the rollers of the first roller group 5 and of the second roller group 6 and via a second deflection roller 29 pivotable about a fourth axis 28. The first and the second roller groups 5, 6 act as a cable storage device 30 which serves for receiving the free sawing cable 25, in particular during a cutting process. By changing the distance A and the number of wraps of the sawing cable 25 in the cable storage device 30, the length of the sawing cable 25 present in a cut (not shown) can be defined. The cable tension (basic tension) and the cutting speed are set by means of the force and the speed with which the distance A is changed.

The roller groups 5, 6 are arranged in such a way that the cable (when the device is stationary) can be mounted in a freely accessible manner in the cable storage device. Cable guide means, in this case in the form of a first eye 34 and a second eye 35, are likewise formed in such a way that the sawing cable 25 can be mounted in a freely accessible manner. The second deflection roller 29 and the second eye 35 are arranged in such a way that, if required, they are displaceable in the direction of the first axis 15. This means that not all windings in the cable storage device need be occupied.

Referring now to FIGS. 1 and 5 collectively, the sawing cable 25 which runs through the cable saw device 1, in this case the direction of an arrow P, is driven by the motor 7 over the first roller group 5. The rollers 50 of the roller group 5 are not rigidly connected to the motor 7 but have in particular operative connections to one another which permit individual cable speeds and any associated speed differences and different force transmissions. Particularly in the case of a change in the length of the sawing cable, it is necessary that relative movements are permissible. The operative connections between the rollers of the first roller group are formed in such a way that the forces transmitted to the sawing cable 25 are not introduced in a concentrated manner at one place. Owing to the design according to the invention, it is instead possible to transmit the forces to meet requirements.

During startup, it is possible, if required, to increase the forces in that part of the sawing cable 25 which is in the interior of the cable storage device 30 in a specific manner, during which the forces of that part of the sawing cable 25 which is present in the cut are correspondingly lower. This achieves increased traction in combination with optimum loading of the sawing cable. It is advantageous, for example particularly during startup, if certain elements are braked in a controlled manner for increasing the traction. In the embodiment shown here, this can be achieved, for example, by braking the first guide roller 27. Correspondingly, other means may also be used.

In the operative connection between the rollers 50 of the roller group 5 with one another and with the motor 7, it is possible, for example, to use idling which permits different cable speeds. Means for compensating different cable speeds or cable forces are advantageous. Such means consist, for example, of differential gears, friction clutches, hydraulic clutches (viscoclutches) aggregately designated 52, or by different, adapted roller diameters. The maximum forces of the sawing cable 25 are preferably controlled by means of load-limiting elements, for example in the form of friction clutches 52. Vibrations and load peaks are efficiently damped. In order to compensate speed differences, the rollers of the roller groups 5, 6 can, if required, have appropriately adapted different diameters. The deflection rollers 5, 6, 27, 29 are, if required, cooled or cleaned by means of water in order to guarantee optimum operation.

The sawing cable 25 can be driven by means of one or more motors 7. Preferably used as motors 7 are hydraulic or electric motors which are preferably arranged so as to act a distance apart along the cable in order to guarantee a distributed load introduction. These are operatively connected to one another in such a way that different cable speeds can be set or compensated. In the case of hydraulic motors, this can be controlled, for example, via corresponding valves which influence the volume flow rates in the hydraulic system.

FIG. 2 shows the cable saw device 1 according to FIG. 1 with an extended cable storage device 30. Here, the cable storage device 30 additionally has three further roller groups 38, 39, 40. These roller groups are arranged in such a way that they permit a flexible adjustment of the length of the sawing cable 25. Here, the rollers are freely accessible from one side, so that simple handling of the sawing cable is guaranteed. As shown, it is not necessary for all rollers to be occupied. If required, the cable storage device 30 can be correspondingly extended. The roller groups 6, 38, 39, 40 can, if required, additionally have means for controlling and monitoring the cable tension or means for driving the sawing cable 25. Particularly suitable are so-called jockey rollers, which permit adaptive control and smoothing of the cable tension. These are spring-mounted rollers which adapt to the cable tension. If required, these may additionally have a retarding effect. If required, cable guidance can be further supplemented and controlled by corresponding means.

FIG. 3 schematically shows a possible tension curve of a sawing cable 25 in a cut region 43 and in the region 44 of a cable storage device 30. The length of a sawing cable 25 is shown schematically along an abscissa 41 and the forces prevailing in the sawing cable are shown along an ordinate 42. As can be seen, the forces increase in the cut region 43 to a maximum value 46 and are then decreased in a controlled manner in the region 44 of a cable storage device from an initial value 45, for example by means of slip with means provided for this purpose. Means for limiting the maximum permissible forces within a sawing cable consist, for example, of friction clutches, hydraulic clutches, electrical means (current limiters), coefficient of sliding friction of the materials involved (roller, cable), etc. They are adjustable in a controlled manner and limit the maximum possible load to a limit 46. This is chosen so that no excessively high stresses in the sawing cable or in the cable saw device occur.

FIG. 4 schematically shows a possible force or tension curve of a sawing cable 25 in a cut region 43 and in the region 44 of a cable storage device 30 during power-up (startup). The length of a sawing cable 25 is shown schematically along an abscissa 41 and the forces prevailing in the sawing cable are shown along an ordinate 42. As can be seen, the forces in a cut region 43 are low in comparison with the region 44 of a cable storage device 30. Consequently, the traction inside the cable storage device 30 is substantially increased. The forces in the sawing cable 25 are low during startup in the cut region 43, which minimizes the loads acting on the sawing cable 25. Here, the tensions in the sawing cable 25 are increased in a controlled manner in the region of the infeed of the sawing cable into the cable storage device 30, for example by means of a braked roller (inter alia a jockey roller) or another means. After the "sawing" operating state has been reached, this retardation is switched off.

What is claimed is:

1. A cable saw device comprising a cable storage device for storing a sawing cable:
   wherein the cable storage device comprises a first and a second roller group with each said group having a plurality of cable deflection rollers arranged axially side by side;
   the first and the second roller groups being arranged a variable distance apart so that a length of a sawing cable stored in the cable storage device forms a plurality of successive turns of coils of the sawing cable around said cable deflection rollers, with said distance being adjustable during a sawing process; and
   a compensating mechanism operatively connecting together at least two of said plurality of cable deflection rollers in said first roller group to compensate for differences in cable tensions and cable speeds within the length by variably distributing rotational drive forces to at least two cable deflection rollers in said first group.

2. The cable saw device as claimed in claim 1, wherein the plurality of cable deflection rollers in said first group are operatively connected by at least one compensating mechanism accommodating different cable tensions and cable speeds occurring in the sawing cable between the cable deflect rollers.

3. The cable saw device as claimed in claim 2, wherein the compensating mechanism comprises one of a friction clutch, a hydraulic clutch, an overrunning clutch and a differential gear.

4. The cable saw device as claimed in claim 1, comprising one of a friction clutch, a hydraulic clutch, electrical means, and coefficient of sliding friction of the material of the rollers disposed to limit application of said driving forces to said coils.

5. The cable saw device as claimed in claim 1, wherein the rollers of the roller groups are freely accessible from one side so that a closed sawing cable can be mounted in loops.

6. The cable saw device as claimed in claim 1, wherein the cable storage device comprises more than two roller groups.

7. The cable saw device as claimed in claim 1, comprised of a motor driving the cable deflection rollers in said first roller group.

8. The cable saw device as claimed in claim 1, comprising an advance system for changing the distance between the roller groups.

9. The cable saw device as claimed in claim 1, comprising at least one of said cable deflection rollers having a brake so that the traction in the cable storage device is increased.

10. The cable saw device as claimed in claim 1, comprising at least one of said cable deflection rollers being spring mounted for adaptive control and smooth of cable tension.

11. The cable saw device as claimed in claim 1, wherein said first roller group is arrayed on a first axis and said second roller group is arrayed on a second axis, further comprising a first deflection roller pivotable around a third axis, oriented with a running direction of the cable and disposed before the first roller group, and a second deflection roller pivotable around a fourth axis, disposed after the second roller group.

12. The cable saw device as claimed in claim 11, comprising a first cable guide arranged between the first pivotable cable deflection roller and the first roller group and a second cable guide arranged between the second roller group and the second pivotable cable deflection roller.

13. The cable saw device as claimed in claim 12, wherein the second cable guide is displaceable in a direction of the first axis.

14. The cable saw device as claimed in claim 1, further comprised of a hydraulic cylinder changing the distance between the first and the second roller group.

15. A cable saw device comprising a cable storage device for storing a sawing cable:
   wherein the cable storage device comprises a first and a second roller group each having a plurality of cable deflection rollers arranged axially side by side;
   the first and the second roller group being arranged a variable distance apart so that a length of the sawing cable stored in the cable storage device is adjustable during a sawing process by varying the distance; and
   a plurality of cable deflection rollers of the cable storage device being driven by a motor and compensating mechanism rotationally coupling a plurality of said cable deflection rollers in said first group while introducing the drive forces into the sawing cable along the length in a distributed manner, thereby compensating for different cable tensions and cable speeds in the sawing cable between the driving cable deflection rollers resulting from a change in the distance between the two roller groups.

16. The cable saw device as claimed in claim 15, wherein the plurality of driving cable deflection rollers in said first group are operatively connected by at least one said compensating mechanism accommodating different cable tensions or cable speeds occurring in the sawing cable between the driving cable deflection rollers.

17. The cable saw device as claimed in claim 15, wherein the compensating mechanism comprises one of a friction clutch, a hydraulic clutch, an overrunning clutch and a differential gear.

18. The cable saw device as claimed in claim 16, wherein the compensating mechanism comprises one of a friction clutch, a hydraulic clutch, an overrunning clutch and a differential gear.

19. The cable saw device as claimed in claim 15, comprising one of a friction clutch, a hydraulic clutch, electrical means, and coefficient of sliding friction of the material of the rollers disposed to limit application of said driving forces to said coils.

20. The cable saw device as claimed in claim 16, comprising one of a friction clutch, a hydraulic clutch, electrical means, and coefficient of sliding friction of the material of the rollers disposed to limit application of said driving forces to said coils.

21. The cable saw device as claimed in claim 15, wherein the rollers of the roller groups are freely accessible from one side so that a closed sawing cable can be mounted within said cable storage device in loops.

22. The cable saw device as claimed in claim 16, wherein the rollers of the roller groups are freely accessible from one side so that a closed sawing cable can be mounted in loops.

23. The cable saw device as claimed in claim 15, wherein the cable storage device comprises more than two roller groups.

24. The cable saw device as claimed in claim 16, wherein the cable storage device comprises more than two roller groups.

25. The cable saw device as claimed in claim 15, comprising an advance system for changing the distance between the roller groups.

26. The cable saw device as claimed in claim 16, comprising an advance system for changing the distance between the roller groups.

27. The cable saw device as claimed in claim 22, comprising at least one of said cable deflection rollers having a brake so that the traction in the cable storage device is increased.

28. The cable saw device as claimed in claim 15, comprising at least one of said cable deflection rollers being spring mounted for adaptive control and smooth of cable tension.

29. The cable saw device as claimed in claim 16, cable deflection roller being spring mounted for adaptive control and smooth of cable tension.

30. The cable saw device as claimed in claim 15, wherein said first roller group is arrayed on a first axis and said second roller group is arrayed on a second axis, further comprising a first deflection roller pivotable around a third axis, oriented with a running direction of the cable and disposed before the first roller group, and a second deflection roller pivotable around a fourth axis is, disposed after the second roller group.

31. The cable saw device as claimed in claim 16, wherein said first roller group is arrayed on a first axis and said second roller group is arrayed on a second axis, further comprising a first deflection roller pivotable around a third axis, oriented with a running direction of the cable being disposed before the first roller group, and a second deflection roller pivotable around a fourth axis is, disposed after the second roller group.

32. The cable saw device as claimed in claim 31, comprising a first cable guide arranged between the first pivotable cable deflection roller and the first roller group and a second cable guide arranged between the second roller group and the second pivotable cable deflection roller.

33. The cable saw device as claimed in claim 32, wherein the second cable guide is displaceable in the direction of the first axis.

34. The cable saw device as claimed in claim 15, further comprising a hydraulic cylinder changing the distance between the first and the second roller.

35. The cable saw device as claimed in claim 16, further comprising a hydraulic cylinder changing the distance between the first and the second roller group.

36. A cable saw device comprising:
a cable storage device comprised of a first and a second roller group with each said group having a plurality of cable deflection rollers arranged axially side by side;
said first and the second roller groups being spaced a variable distance apart to accommodate a length of a sawing cable stored in successive turns of coils of the saw cable around said cable deflection rollers, with said distance being adjustable during movement of the sawing cable in a sawing process; and
a drive mechanism introducing a distribution of driving forces to successive turns of coils of the saw cable stored in the cable storage device by applying different rotational drive forces to a plurality of cable deflection rollers in said first group in a distributed manner during a change in said distance.

37. The cable saw device as claimed in claim 36, with said driving mechanism comprising a plurality of clutches coupling said plurality of cable deflection rollers in said first group.

38. A cable saw assembly process, comprising:
forming a cable storage device by assembling a first roller group comprised of a plurality of cable deflection rollers arranged axially side-by-side, and a second roller group comprised of a plurality of cable deflection rollers arranged axially side-by-side;
spacing said first roller group and said second roller group a variable distance apart to accommodate a length of sawing cable stored in successive turns of coils of the saw cable around said cable deflection rollers; and
mounting a drive mechanism to introduce a distribution of drive forces to successive turns of coils of the saw cable stored in the cable storage device by applying different rotational drive forces to a multiplicity of said cable deflection rollers in said first roller group.

39. The process of claim 38, comprised of mounting said drive mechanism to introduce a distribution of drive forces to successive turns of coils of the cable saw stored in the cable storage device by applying different rotational drive forces to said multiplicity of said cable deflection rollers in said first group in a distributed manner during a change in said distance.

40. The process of claim 38, comprised of assembling said drive mechanism with a plurality of clutches coupling said multiplicity of said cable deflection rollers in said first group to a motor.

* * * * *